Patented Mar. 27, 1951

2,546,916

UNITED STATES PATENT OFFICE 2,546,916

METHOD OF REFINING HYDROCARBON LUBRICATING OILS

Darwin E. Badertscher and William H. King, Woodbury, N. J., assignors to Socony-Vacuum Oil Company, Incorporated, a corporation of New York No Drawing. Application October 19, 1948, Serial No. 55,248

4 Claims. (Cl. 196—39)

This invention has to do with the art of refining, and more specifically has to do with a method of refining those hydrocarbon fractions commonly known as lubricating oil fractions.

As contemplated herein, a hydrocarbon lubricating oil fraction, particularly a residual type fraction, is treated with hydrogen fluoride in any manner known to the refining art for the treatment of a hydrocarbon fraction with a mineral acid. For example, hydrogen fluoride (either anhydrous or aqueous) may be mixed with the oil fraction, the mixture agitated for a suitable period of time to provide intimate contact and to form an emulsion. After a suitable time of intimate contact such as provided by the formation of the emulsion, the mixture is stratified to form a layer of treated oil containing a minor portion of the hydrogen fluoride and a fluid layer of sludge-like material comprising less stable undesirable constituents of the oil associated with a major portion of the liquid hydrogen fluoride. The liquid layer comprising the less stable undesirable constituents of the oil converted to sludge-like materials and associated with a major portion of the hydrogen fluoride in liquid state is then separated from the treated oil by decantation or similar means and the hydrogen fluoride recovered from the sludge-like materials in any suitable manner as by distillation and condensation. Several means may be resorted to for removing any free hydrogen fluoride which remains in the mixture. It may be removed by distillation and/or by caustic washing of the treated oil followed by water-washing and blowing with air. Any recovered free hydrogen fluoride may be recycled to the treating process. Another means involves the addition of sodium fluoride to the treated oil so as to convert free hydrogen fluoride to sodium acid fluoride (according to the equation $HF + NaF \rightarrow NaHF_2$), filtering the oil mixture, caustic and water-washing and air blowing the filtered oil. As a final step, it is desirable to percolate the treated oil through clay or a similar medium.

The hydrocarbon fractions contemplated herein for refinement with hydrogen fluoride are those fractions which come within the class of lubricating oil fractions and which are most commonly identified by their viscosity characteristics, 35 seconds, S. U. V. at 100° F. to about 300 seconds, S. U. V. at 210° F. The refining agent, hydrogen fluoride, used herein, may be either anhydrous or aqueous, and it will be obvious that the amount of such agent used will vary with the character of the oil fraction to be treated. As indicated hereinafter in the illustrative examples, the temperature of the refining treatment is preferably maintained in the range of about 0° C. (32° F.) to about 30° C. (86° F.), but somewhat higher and lower temperatures, such as from about −30° C. (−22° F.) to about 150° C. (+302° F.) or even up to 205°–210° C. (401°–410° F.) may be used without appreciably reducing the stability of the final product.

It will be apparent that the equipment used in carrying out the refining treatment should be metallic, such as copper, iron, stainless steel, etc.; obviously, glass equipment is undesirable in view of the characteristic action of hydrogen fluoride on glass.

Heretofore it has been the practice when refining residual lubricating oil fractions containing large amounts of asphalt to deasphalt the residual lubricating oil fraction in some manner such as by distillation or solvent deasphalting, for example, with propane and to follow the deasphalting treatment with a sulfuric acid refining treatment. It has now been found that the two-step prior art treatment can be replaced with a one-step deasphalting and refining operation and improved results obtained. That is to say, residual lubricating oil fractions containing relatively large amounts of those constituents usually designated as asphalts in the industry, can be treated with hydrogen fluoride as described hereinafter without previous deasphalting. Thus, the present invention provides a means whereby the two-step deasphalting operation followed by a sulfuric acid refining operation can be replaced by a one-step treatment with hydrogen fluoride which achieves deasphalting and refining in one step.

The use of hydrogen fluoride in the treatment of hydrocarbon lubricating oil fractions, particularly of the residual type is especially advantageous when the oil to be treated is one containing relatively large amounts of those constituents usually designated as asphalts in the industry. For example, there are high boiling fractions of some mineral oils which must first be deasphalted and then treated with sulfuric acid before dewaxing to provide suitable base stock for lubricating oil manufacture. Such residual-type fractions obtained by topping the crude are particularly adaptable to treatment with hydrogen fluoride. The following exposition emphasizes the foregoing.

The viscosity-gravity-constant (VGC) is a measure of oil quality that has been employed by refiners of lubricating oil to control the quality of the oil during manufacture. The VGC of the lower viscosity oils, such as distillate stocks, is more accurately determined than the viscosity index which is another measure of quality. Viscosity index (VI) is commonly employed as a measure of the quality of the more viscous type oils, such as those derived from residual stocks. As the value of VGC decreases and the value of viscosity index increases, the quality of the oil improves. Therefore, in order to compare the results produced by different methods of treating it is desirable to produce oil of the same VGC or the same VI and compare the yields. It has been established that a residual type oil, which cannot be treated with sulfuric acid alone to produce an oil of comparable quality in practical yields can be treated with hydrogen fluoride as the sole treating agent and high quality oil obtained in increased yield. That is to say, the production of a finished oil of about 85 VI in a yield of waxy raffinate of 61 volume per cent can be obtained employing hydrogen fluoride whereas for the propane deasphalted-sulfuric acid treated oil of approximately the same VI the yield of waxy raffinate is only 49 volume per cent. When a similar residuum was treated to produce a finished oil having a VGC of approximately 0.853 the yield of waxy raffinate for the hydrogen fluoride treated oil was 74 volume per cent whereas the yield of waxy raffinate from the same oil by propane deasphalting followed by sulfuric acid treatment was 61 volume per cent. It should also be noted and emphasized that the viscosity of the finished hydrogen fluoride-treated oil is higher than for the propane deasphalted, sulfuric acid treated oil. This means that considerably more oil of a given viscosity grade can be made by treating with hydrogen fluoride than can be made by deasphalting with propane followed by sulfuric acid treatment. For example, more SAE 30 grade oil can be made by blending the hydrogen fluoride treated residual stock with a lower viscosity distillate stock than can be made by blending propane deasphalted-sulfuric acid stock with the same distillate. It is to be noted that in the treatment of stocks such as these, it is not possible to treat the residuum with sulfuric acid without first removing the asphalt as by propane deasphalting. Sulfuric acid treatment in the absence of deasphalting and in the presence of the large quantities of asphalt found in these residual stocks is impractical due to the difficulties encountered in separation of the sludge. It will be noted that when a residual type oil is treated with sulfuric acid in an amount to yield approximately the same amount of finished oil the VI of the propane deasphalted, sulfuric acid treated, dewaxed oil is so low as compared to the VI of the same oil fraction treated with hydrogen fluoride without propane deasphalting that the finished oils are not in the same class from a standpoint of quality. Thus, when a residual type oil was deasphalted with propane and the deasphalted raffinate treated with 15 pounds of sulfuric acid per 50 gallon barrel, the overall yield on the crude was 71.7 per cent as compared to 74.4 per cent when the undeasphalted oil was treated with hydrogen fluoride. However, although the yield of propane-deasphalted, sulfuric acid treated oil approached that of the oil treated only with hydrogen fluoride, nevertheless the VI for the sulfuric acid treated oil after dewaxing in the usual manner was 75 as compared to 86 for the hydrogen fluoride treated oil after conventional dewaxing. In other words, if approximately the same overall yield is to be obtained by propane deasphalting and sulfuric acid treating quality must be sacrificed as compared to the quality at the same or better yield by treatment with hydrogen fluoride alone.

Data supporting the foregoing statements is presented in Tables III and IV.

TABLE III

*Preparation and properties of HF refined and of propane deasphalted, sulfuric acid refined lubricants from residuum*

|  | Propane Deasphalted Sulfuric Acid Treated | | | H. F. Treated | |
|---|---|---|---|---|---|
| Processing Conditions | | | | | |
| H. F. Treating: | | | | | |
| # Per 50 gal. bbl | | | | 119 | |
| Per Cent Vol. (based on untreated residuum) | | | | 29.2 | |
| Temperature, °F | | | | 240 | |
| Propane Deasphalting: | | | | | |
| Per Cent Vol. Propane | 800 | | | | |
| Temperature, °F | 125 | | | | |
| Sulfuric Acid Treating: | | | | | |
| # Per 50 gal. bbl | | 50 | | | |
| Per Cent Vol. (based on deasphalted oil) | | 6.7 | | | |
| Temperature, °F | | 128–145 | | | |
| Neutralization: | | | | | |
| Per Cent Weight Bead Fines | | 7.0 | | | |
| Temperature, °F | | 500 | | | |
| Yields, Per Cent Volume | | | | | |
| On Process: | | | | | |
| Deasphalting | 63.2 | | | | |
| Dewaxing Ultimate | | | 88.2 | | 87.7 |
| Acid Treating | | 77.1 | | 61.3 | |
| Overall: | | | | | |
| On Charge | 100 | 63.2 | 48.8 | 41.9 | 61.3 | 52.1 |
| On Crude | 29.5 | 18.6 | 14.4 | 12.4 | 18.1 | 15.4 |

TABLE III—Continued

|  | Raw Residuum | Deasphalted Oil | Acid Treated Waxy Raff. | Dewaxed Oil | HF Treated Waxy Raff. | Dewaxed Oil |
|---|---|---|---|---|---|---|
| *Processing Step* | | | | | | |
| Inspections: | | | | | | |
| Gravity, °A. P. I. | 13.8 | 21.6 | 24.2 | 23.6 | 22.7 | 22.1 |
| Gravity, Specific @ 60° F. | 0.9739 | 0.9245 | 0.9088 | 0.9123 | 0.9175 | 0.9212 |
| Pour Point, °F. | | | | 15 | | 10 |
| Flash Point, °F. (COC) | 580 | 540 | | 550 | 485 | 515 |
| Fire Point, °F. (COC) | 660 | 630 | | 625 | 630 | 615 |
| K. V. @ 100° F., Centistokes | | | | 715.5 | | 1105 |
| K. V. @ 210° F., Centistokes | 231 | 35.62 | 30.70 | 34.76 | 39.58 | 45.97 |
| S. U. V. @ 100° F., seconds | | | | 3306 | | 5105 |
| S. U. V. @ 210° F., seconds | 1074 | 171.2 | 145.0 | 163 | 185.1 | 214.4 |
| Viscosity Index | | | | 85 | | 87 |
| Viscosity Gravity Constant @ 210° F. | | 0.843 | 0.826 | 0.829 | | 0.836 |
| Neutralization No., Mg. KOH/Gm. | | | 0.05 | | 0.1 | |

TABLE IV

*Preparation and properties of HF refined and of modified deasphalted, sulfuric acid refined lubricants from residuum*

|  | Modified Deasphalted Sulfuric Acid Treated | HF Treated |
|---|---|---|
| *Processing Conditions* | | |
| HF Treating: | | |
| Per Cent Vol. (based on untreated residuum) | | 27.4 |
| Temperature, °F. | | 230 (approx.) |
| Modified Deasphalting: | | |
| Per Cent Vol. Propane | 750 | |
| Per Cent Vol. Modifier | 50 | |
| Temperature, °F. | 180 | |
| Sulfuric Acid Treating: | | |
| # Per 50 gal. bbl. | (¹) 15 | (¹) 50 |
| Per Cent Vol. (based on deasphalted oil) | 2.0 | 6.7 |
| Temperature, °F. | 111–118 | 118–125 |
| *Yields, Per Cent Volume (Waxy Raffinate)* | | |
| On Process: | | |
| Deasphalting | 82.9 | |
| Acid Treating | 86.5 | 73.7 |
| Overall on Charge Prior to Dewaxing | 71.7 | 61.1 |

|  | Raw Residuum | Deasphalted and Dewaxed | Acid Treated and Dewaxed | Dewaxed and Percolated |
|---|---|---|---|---|
| *Processing Step* | | | | |
| Inspections of Dewaxed Oils: | | | | |
| Gravity, °A. P. I. | 14.1 | 18.4 | 19.3 | 21.3 | 21.4 |
| Gravity, Specific @ 60° F. | 0.9717 | 0.9440 | 0.9383 | 0.9260 | 0.9254 |
| Pour Point, °F. | 70 | 10 | 10 | 10 | 15 |
| Flash Point, °F. (COC) | 495 | 500 | 495 | 490 | 470 |
| Fire Point, °F. (COC) | 585 | 590 | 575 | 565 | 565 |
| S. U. V. @ 100° F. (Seconds) | | 2965 | 2333 | 1711 | 1857 |
| S. U. V. @ 210° F. (Seconds) | 258 | 137 | 124.5 | 110 | 117.0 |
| Viscosity Index | | 68 | 75 | 83 | 86 |
| Viscosity Gravity Constant @ 210° F. | | | | 0.854 | 0.853 |
| Carbon Residue, Per Cent Weight (Conradson) | 12.5 | 3.0 | | | 2.2 |

¹ Waxy Oil Neutralized by Contacting with Bead Fines.

Table III establishes that the overall yield, based on untreated residuum, of oil having VI of 85–87 is 26 per cent greater employing hydrogen fluoride than when employing propane deasphalting followed by sulfuric acid treatment. Furthermore, since the S. U. V. @ 100° F. is 5105 seconds for the hydrogen fluoride treated oil as compared to 3306 seconds for the propane deasphalted-sulfuric acid treated oil, 38 per cent volume more SAE 30 oil can be obtained from the crude by treating the residuum with hydrogen fluoride than by propane deasphalting followed by sulfuric acid treatment.

Although the present invention is described herein by several representative and preferred refining treats and the oils obtained therewith, it will be readily understood by those skilled in the art that many variations and modifications may be made in the conditions employed without departing from the spirit of this invention. Therefore, this invention is not to be construed as limited by such illustrations, but is to be construed broadly as coming within the scope of the appended claims.

The present application is a continuation-in-part of our copending application Serial Number 473,014, filed January 20, 1943, now abandoned.

We claim:

1. The method of refining a residual lubricating oil fraction containing relatively large amounts of asphalt and not treatable in a practical manner by sulfuric acid alone, which consists of adding to said residuum containing relatively large amounts of asphalt at least 10 volume per cent based upon said oil fraction of a selective treating agent consisting essentially of hydrogen fluoride to form a hydrocarbon phase and a liquid phase comprising liquid hydrogen fluoride maintaining said residuum and said hydrogen fluoride under conditions of temperature and pressure to maintain the hydrogen fluoride in liquid state, agitating said residuum and said hydrogen fluoride to produce an emulsion and thereby ensure intimate contact of said residuum and said hydrogen fluoride whereby said asphalt and other undesirable materials present in said residuum are converted into sludge-like material associated with said hydrogen fluoride, stratifying said emulsion to obtain a liquid hydrocarbon phase and a liquid phase comprising said sludge-like material and liquid hydrogen fluoride, separating said liquid phase comprising sludge-like material associated with liquid hydrogen fluoride, and separating hydrogen fluoride from sludge-like material.

2. The method of refining residual lubricating hydrocarbon oil fraction containing unstable asphaltic and other materials which consists of adding a treating agent having selective action consisting essentially of hydrogen fluoride to a residual hydrocarbon oil containing asphalt in amounts sufficient to preclude treatment of said residual oil by sulfuric acid alone in amounts of 10 to 50 volume per cent based upon said residual oil to form a liquid hydrogen fluoride phase, agitating said residual oil and said hydrogen fluoride at a temperature of about 230° F. to about 305° F. under pressure sufficient to maintain said hydrogen fluoride in the liquid phase and for a period of time sufficient to form an emulsion of said residuum and said hydrogen fluoride to convert said unstable materials including said asphaltic materials into sludge-like materials, stratifying said emulsion, separating liquid hydrogen fluoride associated with said sludge-like material and separating hydrogen fluoride from said sludge-like material.

3. The method of refining a residual lubricating oil fraction which consists of mixing a residual lubricating oil fraction containing asphalt in amounts sufficient to preclude treatment of said residual lubricating oil fraction by sulfuric acid alone with a treating agent having selective action consisting essentially of hydrogen fluoride, the amount of said treating agent being about 10 to about 50 volume per cent based upon said residual lubricating oil fraction and being sufficient to form a liquid hydrogen fluoride phase, agitating said residual lubricating oil fraction and said hydrogen fluoride at a temperature of about 230° F. to about 410° F. under pressure sufficient to maintain said hydrogen fluoride in the liquid phase and for a period of time sufficient to form an emulsion of said residual lubricating oil fraction and said hydrogen fluoride to convert said asphaltic materials into sludge-like materials, stratifying said emulsion, separating liquid hydrogen fluoride associated with said sludge-like material, and dewaxing said treated oil whereby dewaxed lubricating grade oil is obtained in about 20 per cent greater yield for comparable quality than is obtained by propane deasphalting and sulfuric acid treating.

4. The process as set forth and described in claim 3 wherein the treated oil is heated to remove hydrogen fluoride.

DARWIN E. BADERTSCHER.
WILLIAM H. KING.

REFERENCES CITED

The following references are of record in the file of this patent:

UNITED STATES PATENTS

| Number | Name | Date |
|---|---|---|
| 1,949,989 | Bray | Mar. 6, 1934 |
| 1,988,712 | Bray et al. | Jan. 22, 1935 |
| 2,343,744 | Burk | Mar. 7, 1944 |
| 2,343,841 | Burk | Mar. 7, 1944 |
| 2,366,743 | Matuszak | Jan. 9, 1945 |
| 2,375,675 | Matuszak | May 8, 1945 |
| 2,378,762 | Frey | June 19, 1945 |
| 2,434,623 | Meadow et al. | Jan. 13, 1948 |

FOREIGN PATENTS

| Number | Country | Date |
|---|---|---|
| 292,932 | Great Britain | May 23, 1929 |
| 292,933 | Great Britain | May 23, 1929 |